US008528752B2

(12) United States Patent
Bowser et al.

(10) Patent No.: US 8,528,752 B2
(45) Date of Patent: Sep. 10, 2013

(54) DISPLAY SYSTEM (75) Inventors: Joseph H. Bowser, Minneapolis, MN (US); Thomas A. Schneider, Circle Pines, MN (US); Blake M. Johnson, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 146 days.

(21) Appl. No.: 12/900,693

(22) Filed: Oct. 8, 2010

(65) Prior Publication Data

US 2012/0085713 A1 Apr. 12, 2012

(51) Int. Cl.
*A47F 5/08* (2006.01)

(52) U.S. Cl.
USPC .......... 211/90.02; 211/103; 248/235; 248/250

(58) Field of Classification Search
USPC .............. 248/214, 227.4, 235, 247, 250, 121, 248/317, 323, 917, 918; 211/90.02, 103, 211/193, 187, 190
See application file for complete search history.

(56) References Cited

U.S. PATENT DOCUMENTS

| 1,968,807 | A | * | 8/1934 | Bowers | 211/105.6 |
|---|---|---|---|---|---|
| 4,809,941 | A | * | 3/1989 | Sheridan | 248/249 |
| 5,305,898 | A | | 4/1994 | Merl | |
| 5,695,078 | A | * | 12/1997 | Otema | 211/103 |
| 6,161,708 | A | * | 12/2000 | Myler | 211/90.02 |
| 6,585,203 | B1 | | 7/2003 | Euker | |
| D493,800 | S | | 8/2004 | Pfister et al. | |
| D497,537 | S | | 10/2004 | O'Keene et al. | |
| 6,857,611 | B2 | | 2/2005 | Obdeijn | |
| D530,595 | S | | 10/2006 | Lam et al. | |
| 7,448,584 | B2 | * | 11/2008 | Chen et al. | 248/278.1 |
| 7,624,959 | B2 | * | 12/2009 | Dozier et al. | 248/294.1 |
| 7,722,002 | B2 | | 5/2010 | O'Keene et al. | |
| 2005/0236544 | A1 | * | 10/2005 | Mancino et al. | 248/304 |
| 2006/0231711 | A1 | | 10/2006 | Shin | |
| 2008/0149576 | A1 | | 6/2008 | Onachilla et al. | |
| 2008/0203040 | A1 | * | 8/2008 | Kologe | 211/103 |
| 2009/0200439 | A1 | | 8/2009 | Bremmon et al. | |
| 2010/0123052 | A1 | | 5/2010 | Cheng et al. | |

FOREIGN PATENT DOCUMENTS

FR 2849581 A1 * 7/2004

* cited by examiner

*Primary Examiner* — Alfred J Wujciak
(74) *Attorney, Agent, or Firm* — Griffiths & Seaton PLLC; JoAnn M. Seaton (57) ABSTRACT

In some implementations, a wall mount system includes a hanger and complementary saddle bracket mount adapted to retain a monitor at an oblique angle relative to a vertical axis such that the monitors are angled downwardly toward retail patrons. The saddle bracket can in various embodiments include a downwardly facing U-shaped channel that receives a complementarily configured hanger bar which is in turn mounted to a display fixture. Such a bracket configuration can permit, in various embodiments, a television monitor that has a saddle bracket attached thereto to be mounted to the display fixture without the use of tools. The saddle bracket is optionally adjustable without the use of handheld tools along a rail system that is mounted to a television monitor. The saddle bracket may further include outwardly extending flanges to receive and retain excess lengths of power cords extending from the monitor supported by the saddle bracket.

19 Claims, 8 Drawing Sheets

DISPLAY SYSTEM

BACKGROUND

Retail stores typically present products to patrons on or in displays to improve shopping experiences. Product displays include electronic kiosks, display spinners, and display cases. A single retail store may include each type of display in a different region of the store and may use a given type of display for particular products.

Consumer electronics are popular items in many retail stores. Therefore, retail stores may allocate designated sections for patrons to browse consumer electronics such as stereos, global positioning systems, and digital cameras. In order to display the electronics in a visible and aesthetic fashion, the retail stores may place the electronics in displays.

Display cases may be used to house high value consumer electronics that may be targets for shoplifters. For example, expensive digital cameras may be displayed in a locked transparent display case. Gaming consoles may be placed in elevated display shelves.

Electronic kiosks are often used to display products that are new and amusing to patrons. For example, component electronics such as Blu-Ray players and DVD players may be displayed in a kiosk located near an entertainment section of a retail store. The electronic kiosks may include controls such as game controllers, keyboards, and/or touchscreens to allow consumers to interact with displayed products.

Component electronics and monitors are sometimes placed on shelving units with tethers tying individual electronic to the shelving units. The shelving units are typically horizontal and extend laterally along an exterior wall of a retail environment. Several such shelves can be contained within the same display unit at a vertical spacing sufficient to accommodate, for example, television monitors. Security tethers can extend from the back of the television monitors to an alarm unit or may be fixed to the shelving units themselves to substantially prevent removal the monitor without an appropriate key or specialized tool needed to detach the security tether.

SUMMARY

In some implementations, a wall mount system includes a hanger and complementary saddle bracket mount adapted to retain a monitor at an oblique angle relative to a vertical axis such that the monitors are angled downwardly toward retail patrons. The saddle bracket can in various embodiments include a downwardly facing U-shaped channel that receives a complementarily configured hanger bar which is in turn mounted to a display fixture. Such a bracket configuration can permit, in various embodiments, a television monitor that has a saddle bracket attached thereto to be mounted to the display fixture without the use of tools. The saddle bracket is optionally adjustable without the use of handheld tools along a rail system that is mounted to a television. The saddle bracket may further include outwardly extending flanges to receive and retain excess lengths of power cords extending from the monitor supported by the saddle bracket. In some implementations, the monitor may be disengaged from the display fixture by slidably decoupling the saddle brackets from the crossbar without the use of handheld tools.

DETAILED DESCRIPTION OF ILLUSTRATIVE IMPLEMENTATIONS

Figure 1:
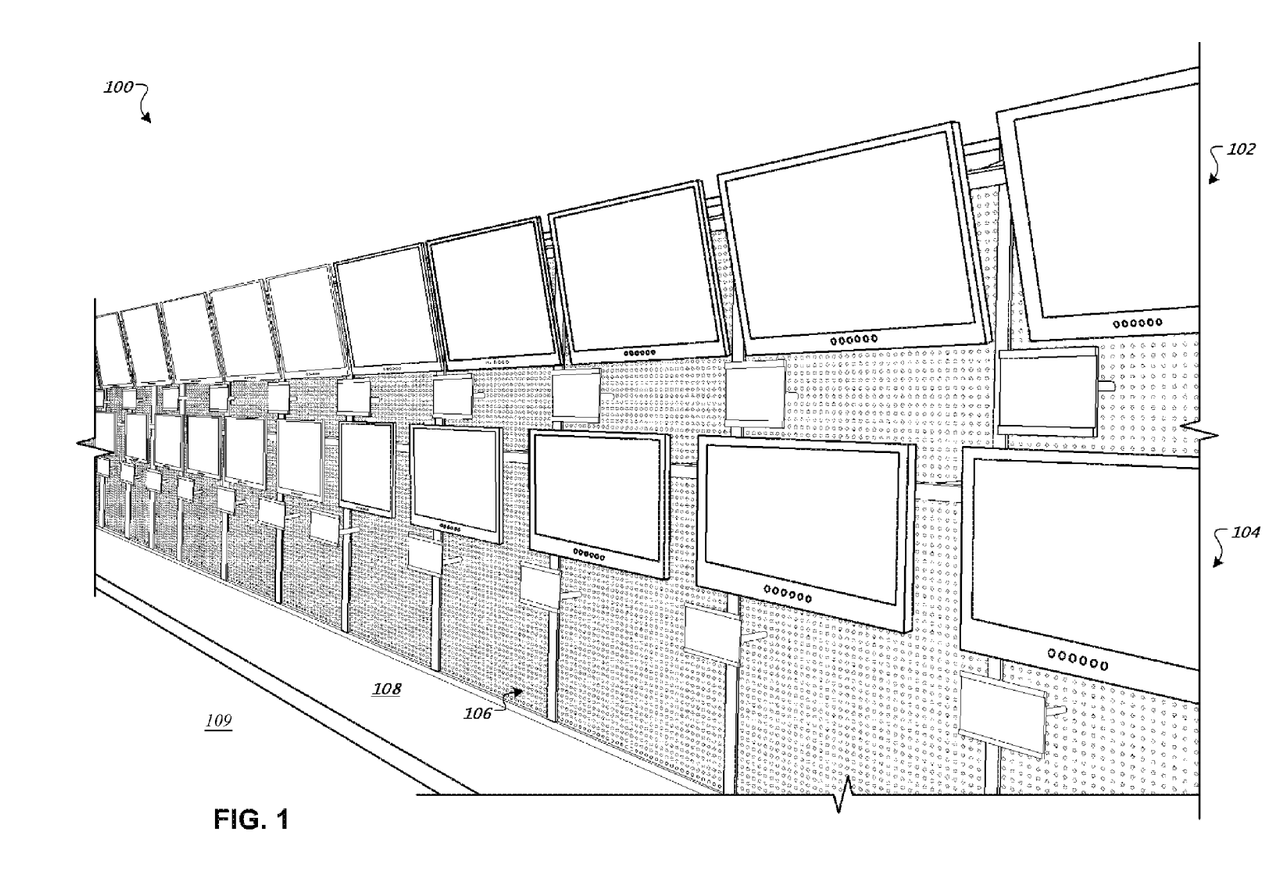
FIG. 1 is a perspective view of an example display system.

FIG. 1 is a perspective view of a display system 100. The display system 100 provides an adjustable and modular system for displaying consumer electronics devices. In general, the display system 100 is used in a retail store to present products, signage or informational placards to customers. The presentation of such products is provided to aid a customer in viewing product details and determining which product is best suited for purchase. For example, upon entering an electronics section of the retail store, the customer views multiple display screens mounted in the display system 100 and can determine which display screen provides the best picture. Example products mounted in the display system 100 include, but are not limited to, televisions, computer monitors, or other such equipment. In some implementations, the products for display include OLED (organic Light Emitting Diode) monitors. In some implementations, the products for display include plasma televisions. In other implementations, a combination of different products are displayed together. For example, the display system 100 can host LCD displays, OLED displays, and plasma displays on multiple crossbars.

The display system 100 enables customers in the retail store to simultaneously view multiple rows of products in a side-by-side manner. For example, LCD televisions can be displayed alongside plasma televisions in the display system 100. Such a display provides a compact viewing area for comparing a number of products that a customer is potentially interested in purchasing.

The display system 100 provides a mechanism for displaying products, such as electronic display monitors, at specific angles directed toward customers browsing in the store. In some implementations, the electronic displays are configured for display at a zero degree straight on angle and without tilt. For example, a retail store employee determines to display a row of products in the display system 100 and determines that such products do not require an angle to best view the product. As such, the retail store employee installs the row of products without a tilt in a row in the display system 100. In some implementations, the retail store employee or vendor may wish to highlight the wide viewing angle of one or more plasma televisions to illustrate the quality of the plasma televisions when observed from a steep viewing angle, for example. Thus, the retail store employee or vendor provides instruction to mount one or more plasma television at a steep angle on the display system 100.

Referring to FIG. 1, the display system 100 is built on standard gondola wall shelving. Although FIG. 1 depicts gondola wall shelving, each component attached to system 100 can be utilized in other wall displays and/or shelving units. The display system 100 includes a top row 102 and a bottom row 104 of electronic displays. Although only two rows are depicted, the display system 100 optionally includes three, four or five horizontal rows. In this example, the display system 100 includes a first type of electronic display in the top row 102 and a second, different type of electronic display in the bottom row 104. Video feeds are provided to each electronic display. For example, the same content (e.g., movie, video game, image, television content, etc.) may be provided to the displays in both rows 102, 104. Customers seeking to purchase one of the two types of electronic displays are able to compare product qualities by viewing both rows simultaneously.

The display system 100 includes one or more back panels 106 (e.g., support panels) for attaching crossbars and/or shelving for purposes of displaying products. The back panels are typically slidably coupled to a base member 108. The back panels can be various widths for purposes of supporting a number of hardware units including crossbars, signage, and hooks. The back panels extend horizontally and include vertically spaced interlocking slots. The back panels provide a support for attachment mechanisms used when mounting one or more products for display. Example attachment mechanisms include clamps, hooks, crossbars, and/or brackets. In the depicted example of the display system 100, two rows of crossbars are connected to a number of back panels positioned near store walls.

The base member 108 includes a base deck assembly. The base deck assembly hosts the base member 108 and support panels (e.g., back panels). The base deck assembly is formed by multiple interlocking sections and the longitudinal edges of each section lock into one another. Each interlocking section includes a recess in which electrical power supply conductors are installed horizontally between each section.

In some implementations, the display system 100 includes a top row of electronic displays placed above products or services offered in the store. For example, the display system 100 provides an option to insert rebates, service options, pricing, directions, or other product information near the product on display. When products and/or service offerings are provided alongside electronic displays, customers are provided opportunities to obtain information pertaining to pricing, operation, warranty, maintenance, and accessories by viewing the contents shown in the top row.

In some implementations, the display system 100 includes facing hardware to provide an aesthetic look and feel to the display. Facing hardware includes trim pieces or similar hardware which can be attached to system 100 components to enhance the display. In some implementations, trim pieces are added to hide particular features of display system 100. For example, trim pieces can be included to hide cords or sharp edges. In some implementations, trim pieces or additional hardware provides a means to route cable throughout system 100.

Figure 2:
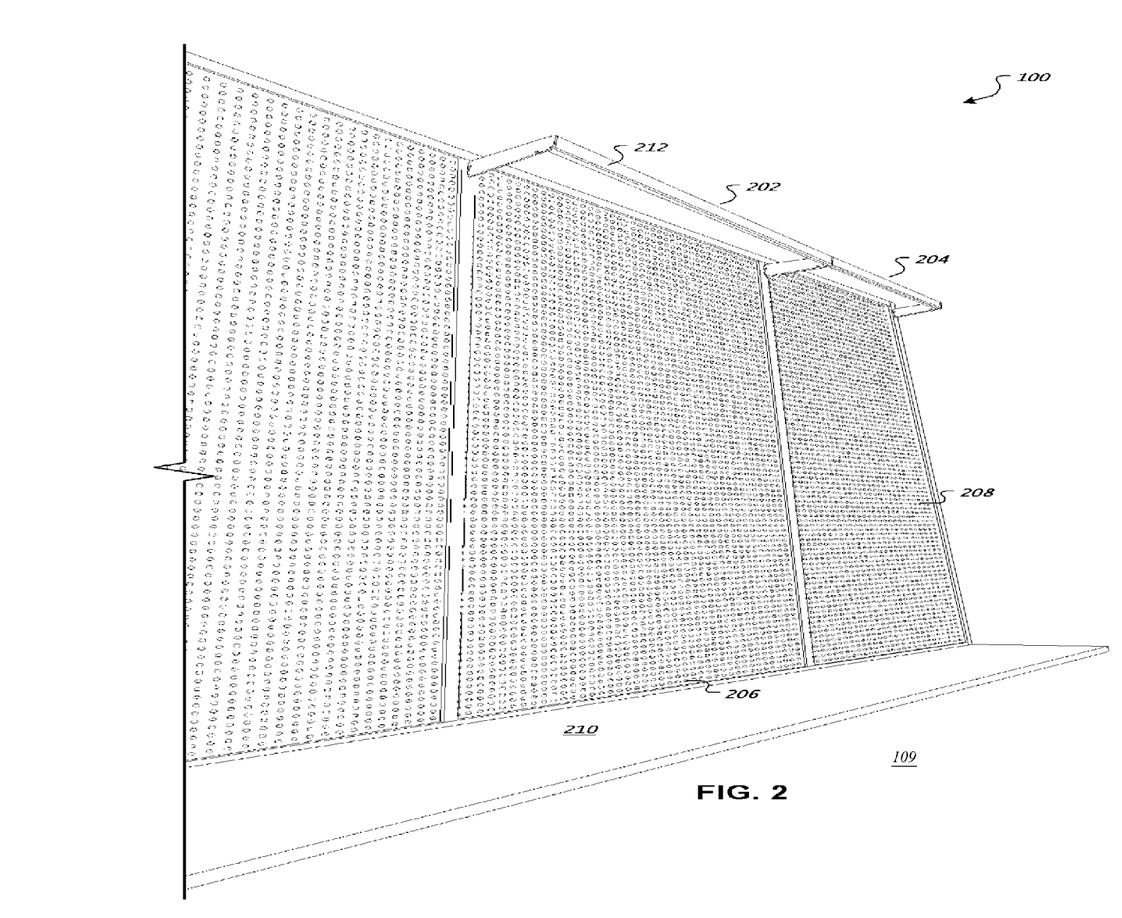
FIG. 2 is another perspective view of the display system of FIG. 1.

FIG. 2 is another perspective view of the display system 100 of FIG. 1. In the depicted example, the display system 100 includes a crossbar 202 and a crossbar 204 mounted on back panels 206 and 208, respectively, and a base unit 210. The base unit 210 provides structural support for the back panels 206 and 208. Each base unit 210 supports at least one back panel. In some implementations, one or more base units 210 can be connected to extend the length of the display system 100.

The back panels 206, 208 are constructed to allow the horizontal installation of one or more crossbars, such as crossbars 202 and 204. The opposed ends of each crossbar occupies a slot in at least one back panel 206, for example. The back panels 206 and 208 are generally formed sheets of pegboard, slat wall, corkboard, plywood, or some combination of the above. Example materials for the back panels 206 and 208 include, but are not limited to wood, metal, plastic, fiberglass, or other support medium. In some implementations, the back panels 206, 208 measure between about 36 inches and about 60 inches in horizontal length. In one example, the back panels 206, 208 are between about 40 inches and about 54 inches in horizontal length, e.g. a horizontal length of about 48 inches. Other horizontal lengths are possible. One or more back panels, similar or dissimilar in horizontal lengths, can be mounted onto one or more base units.

The crossbar 202 represents a hanger member that includes a laterally extending crossbar with a front surface and a back surface. Each crossbar 202 includes rearwardly extending mounting portions. In some implementations, the crossbar 202 is detachably coupled to the back panel 206 via the hanger member.

Each crossbar is capable of receiving a product for display. For example, a retail store employee can install an LCD display screen on the crossbar 202. In this example, the crossbar 202 is a straight crossbar that includes an anterior surface 212 parallel to the back panel 206. The anterior surface 212 is attached to saddle brackets that are latchable into the back panel 206, for example. Saddle brackets are discussed below with reference to FIGS. 6 and 7.

In general, a user installs crossbars 202 and 204 to back panels 206 and 208, respectively, to construct the display system 100 as shown in FIG. 2. In particular, store personnel are able to install the crossbars 202, 204 parallel to the back panels 206, 208 to provide a straight on view of merchandise when such merchandise is installed on one of the crossbars 202 and 204. In this example, crossbars 202 and 204 are downwardly canted for the purposes of displaying merchandise (e.g., LCD display panels) at an appropriate viewing angle targeted toward a floor 109 (FIGS. 1 and 2), where back panels 206, 208 extend upwardly relative to floor 109.

The cant angle of the downwardly tilted crossbars generally varies from about 5 to about 30 degrees, measured from the front surface 212 to a plane parallel to the back panel 202. In various embodiments, the cant angle is about 5-15 degrees, about 10-20 degrees, about 15-25 degrees, or about 20-30 degrees. In selected embodiments, the cant angle is about 5 degrees or about 10 degrees.

In some implementations, the crossbar 202 is a straight crossbar supported by end brackets providing about a 5-inch standoff from the display system. The straight crossbar is optionally designed to stand about 10 inches away from the back panel 202. In other embodiments, the crossbar is disposed about 5 or about 15 inches away from the back panel 202. A number of different-sized end brackets can be employed to support crossbars in display system 100, as will be discussed further in connection with FIG. 3. The end brackets are generally selected based on the weight and size of the product being displayed on a particular crossbar.

Figure 3:
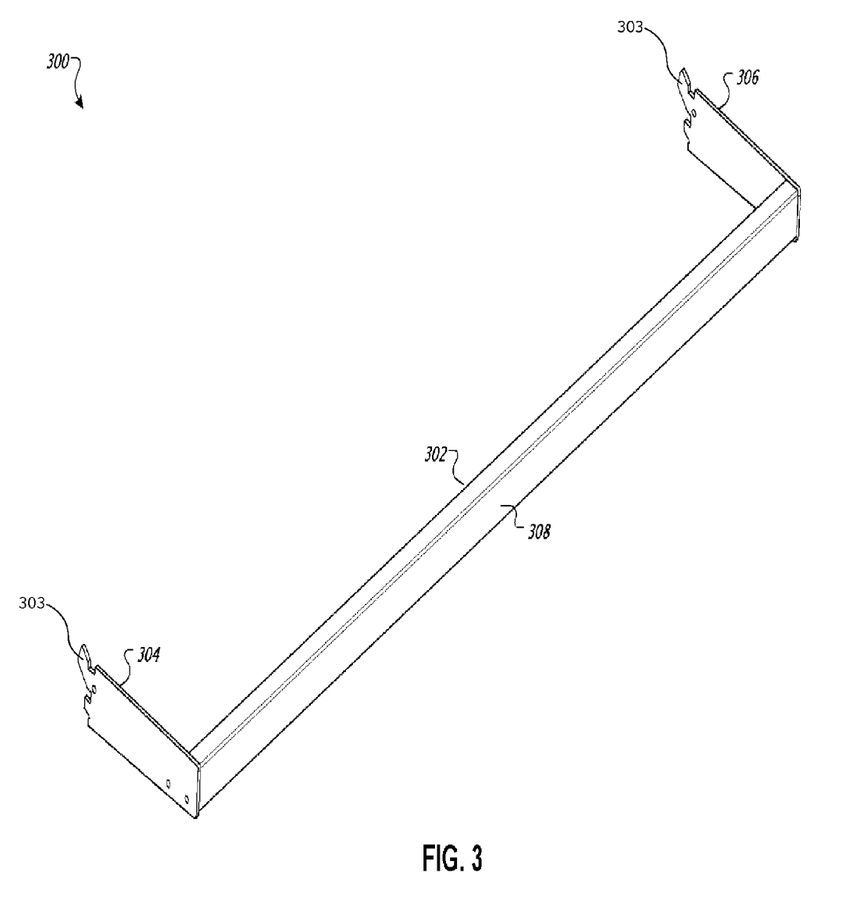
FIG. 3 is a perspective view of a straight crossbar.

FIG. 3 is a perspective view of a straight crossbar 300. The straight crossbar 300 includes a main beam 302 coupled to a side bracket 304 and a side bracket 306. The side brackets 304, 306 are welded to main beam 302. Both side brackets 304, 306 are perpendicular to the main beam 302 and parallel to each other.

A front surface 308 of the main beam 302 is parallel to a back panel (not shown). The main beam 302 is positioned between the two side brackets 304, 306 with one end of each side bracket connecting to one end of the main beam 302. The other ends of the side brackets 304, 306 each include rearwardly extending pegs 303 that can be connected to the hooks or spaces in the back panel. In some implementations, the main beam 302 measures a length between about 36 inches and about 60 inches. The side brackets measure between about 1 inch and about 9 inches in length. In one example, the main beam 302 is between about 40 inches and about 55 inches in length, e.g., a length of about 50 inches. In some implementations, the side brackets 304, 306 are between about 3 inches and about 7 inches in length, e.g., a length of about 5 inches.

Figure 4:
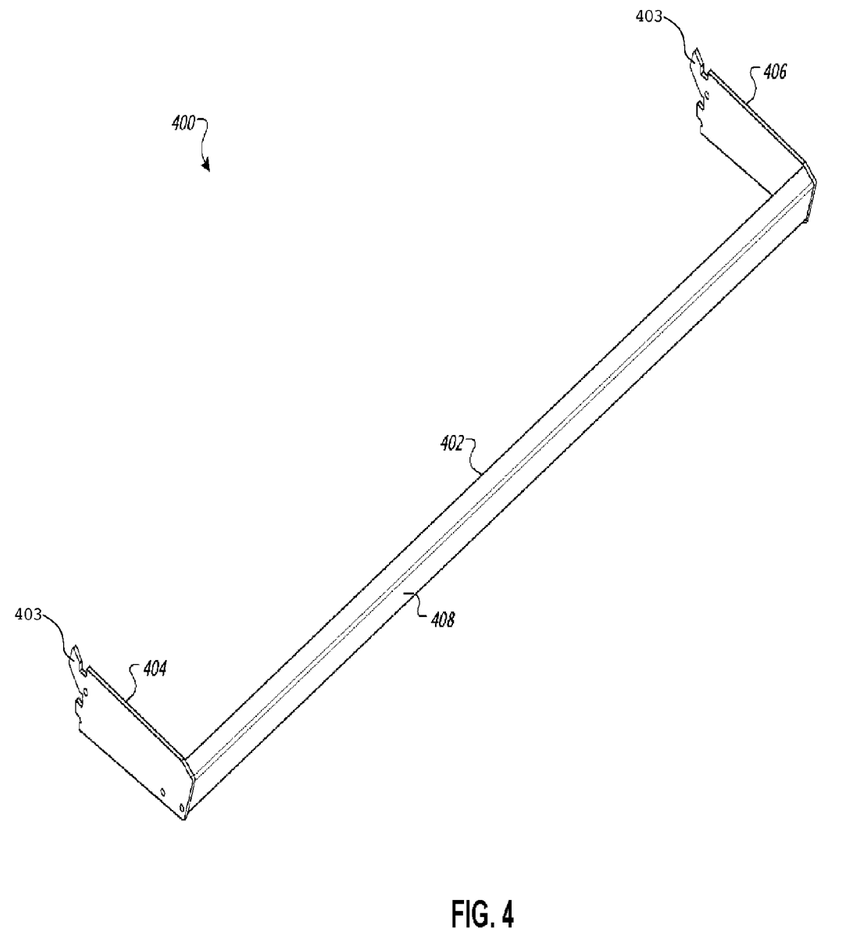
FIG. 4 is a perspective view of a downward-slanted crossbar.

FIG. 4 is a perspective view of a downward-slanted crossbar 400. The downward-slanted crossbar 400 includes a main beam 402 and two side brackets 404, 406. Similar to the side brackets in FIG. 3 above, both side brackets 404, 406 are perpendicular to the main beam 402, and parallel to one another. The main beam 402 is positioned between the two side brackets 404, 406 with one end of each side bracket connecting to one end of the main beam 402. The opposite ends of each side bracket 404, 406 each include rearwardly extending pegs 403 that are typically connected to a back panel.

A front surface 408 of the downward-slanted crossbar 400 forms an angle greater than 0° with the plane parallel to a back panel coupled to the side brackets 404, 406. The angle of the front surface ranges from 5-15 degrees, where a user optionally installs a crossbar with a 15 degree tilt if, for example, that viewing angle is appropriate given the relative position of the screen and the position of persons viewing the screen. In a similar fashion, the user may install a crossbar with zero tilt or a 5-degree tilt to better display a particular product. Similarly, in some implementations, the angle of the front surface ranges from 10-20 degrees, 15-25 degrees, or 20-30 degrees.

In some implementations, the main beam 402 is between about 36 inches and about 60 inches in length. The side brackets 404, 406 are between about 4 inches and about 14 inches in length. In an example, the main beam 402 is between about 40 inches and about 54 inches in length, e.g., a length of about 48 inches. In another example, the side brackets 404, 406 are between about 7 inches and about 14 inches in length, e.g., a length of about 9 inches.

Example materials for the straight crossbar 300 and/or the downward-slanted crossbar 400 include metal, wood, plastic, or a composite. In some implementations, the selected material is molded into a crossbar of a particular size. In some implementations, the crossbar is composed of a combination of parts fastened together. If, for example, the crossbar is composed of wood or composite, the crossbar is carved or cut to a particular size.

In some implementations, the straight crossbar 300 and/or the downward-slanted crossbar 400 include one or more circumferential detents, indentations or grooves (not shown) on their main beams 302, 402 and/or front surfaces 308, 408. The detents, indentations or grooves impede the lateral movement of saddle brackets, for example. The saddle brackets are discussed below with reference to FIG. 6 and FIG. 7.

In some implementations, the crossbars 300 and 400 are rectangular in shape. In other implementations, the crossbars 300 and 400 are U-shaped. In yet other implementations, the crossbars 300 and 400 are hexagonally shaped. Other shapes are also possible and a number of different shaped crossbars can be utilized in a single display system.

Figure 5:
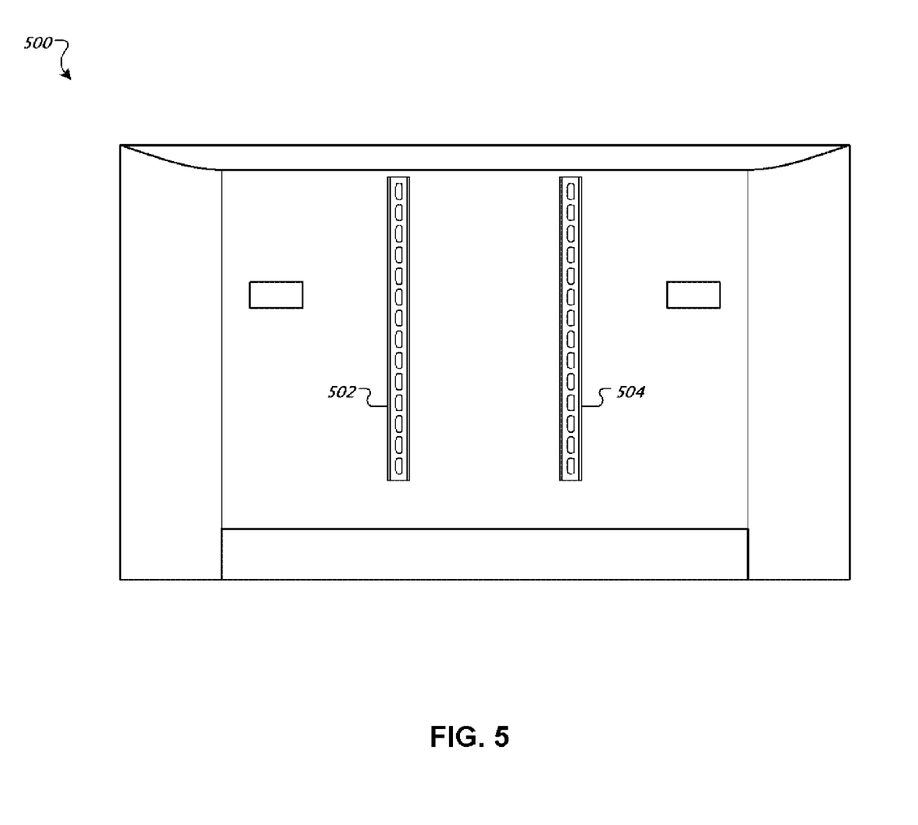
FIG. 5 is a rear view of a display screen with mounting channels.

FIG. 5 is a rear view of a display screen 500 with mounting channels 502, 504. In this example, the two mounting channels 502, 504 are connected to the display screen 500 using fasteners (not shown). The number of mounting channels 502, 504 are generally selected for use based on the size and/or weight of the product selected for mounting on the system 100. In some implementations, the two mounting channels 502, 504 are parallel to each other, and perpendicular to a mountable crossbar. The mounting channels 502, 504 provide a means of attachment for products, such as display screens, which can be mounted on crossbars attached to back panels, as illustrated in FIG. 1.

Figure 6:
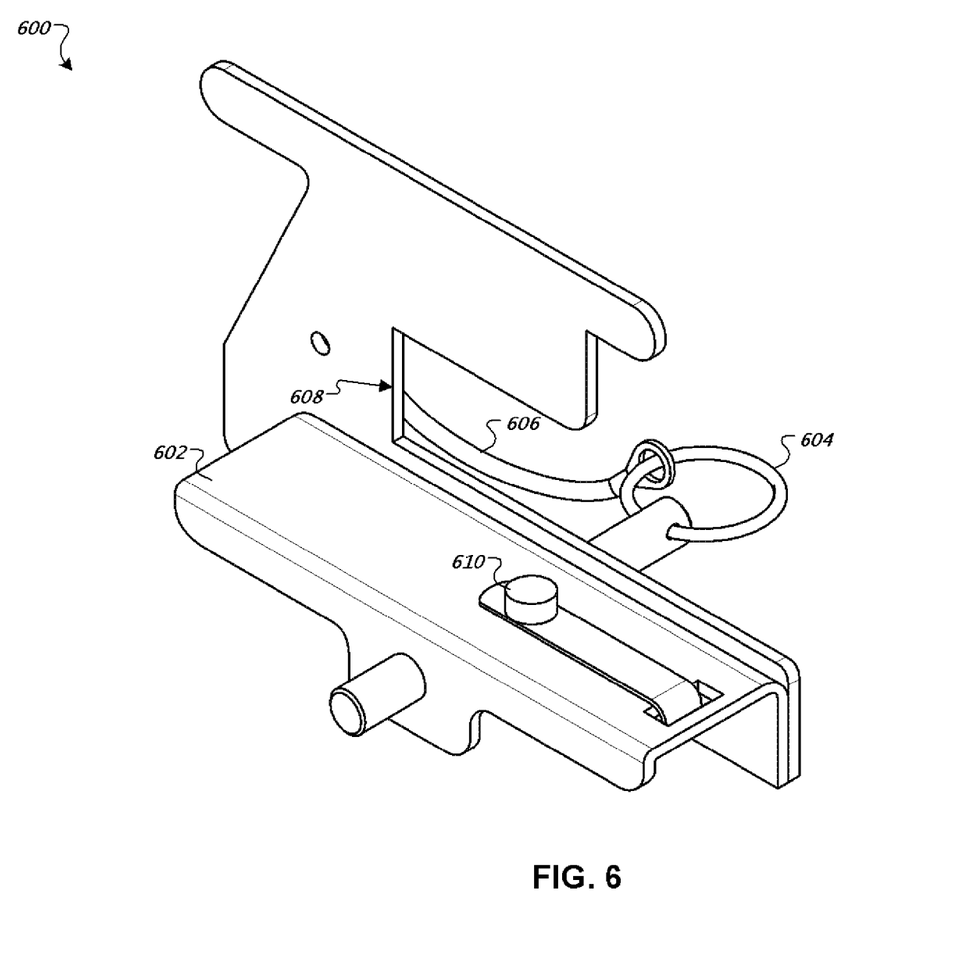
FIG. 6 is a perspective view of a saddle bracket.

FIG. 6 is a perspective view of a saddle bracket 600. The saddle bracket 600 is provided as an attachment mechanism for displaying products in the display system 100, for example. In general, the saddle bracket 600 attaches to a product via mounting channels (shown in FIG. 5 above) to generate a modular display unit which can be easily moved or adjusted in display system 100. For example, a user can assemble the modular display unit on a flat surface near the base of the display system 100 and upon completion of the assembly, the user slides the module display unit onto a straight or downward-slanted crossbar, as shown in FIG. 1. In another example, the user is able to lift the modular display unit from the display system 100 to decouple the saddle bracket 600 and the downward-slanted crossbar, as shown in FIG. 1. The user can engage a quick release button and/or remove other safety devices to decouple the saddle bracket 600, as discussed in detail below. In some implementations, the user applies an upward movement of the saddle bracket 600 to cause a disengagement of the bracket 600 from a crossbar. For example, the user can apply an upward sliding movement at a constant angle of 15 degrees from the horizontal. This angled upward movement allows the user to remove the product from the crossbar without using tools or additional hardware.

The saddle bracket 600 is a "U" shaped structure fashioned from materials, such as steel, aluminum, stainless steel, cast iron, plastic, or other solid material capable of holding the weight of consumer electronic products. The saddle bracket 600 is designed to mate with at least one type of crossbar. For example, the saddle bracket 600 can be attached to the straight crossbar 300 (FIG. 3) or the downward-slanted crossbar 400 (FIG. 4).

The saddle bracket 600 includes an offset portion or bracket guide 602 designed to interface with a mounting channel (e.g., mounting channel 502) coupled to an LCD display screen, for example. The saddle bracket 600 is secured to the mounting channel using a quick release pin 604. A user aligns the apertures in the bracket guide 602 with the desired aperture in a mounting channel 502 or 504 secured to a product. The quick release pin 604 is tethered to the saddle bracket 600 using a lanyard 606. The lanyard 606 provides an advantage of securing the quick release pin to ensure a pin is available at time of installation. The pin 604 optionally includes a spring loaded ball bearing or other detent mechanism that can cooperate with an optional complementary structure on the bracket guide 602 or otherwise impede the sliding of the pin through the apertures in the bracket guide 602.

The saddle bracket 600 includes a notched portion dimensioned to engage with a crossbar. For example, the saddle bracket 600 includes a rectangular channel 608 dimensioned to mate with a crossbar, such as crossbars 300 or 400. The rectangular channel 608 provides an interference fit with the crossbar installed on the system 100, for example. Once the saddle bracket 600 is installed on the crossbar, a quick release button 610 is automatically engaged to lock the saddle bracket 600 onto the crossbar. Although the saddle bracket 600 is shown in FIG. 6 with a rectangular shaped channel, other shapes can be used in the channel 608 including, but not limited to square, rhomboid, J-shaped, hexagonally shaped, or triangular shaped channels.

The channel 608 is engageable with a crossbar. The engagement occurs when a user slides the channel 608 of the saddle bracket 600 over the crossbar to lock the product for display in place. The locking of the product for display immobilizes the product in a specific viewing angle. In some implementations, the locking of the product for display disables flexible movement of the product in any direction.

Figure 7:
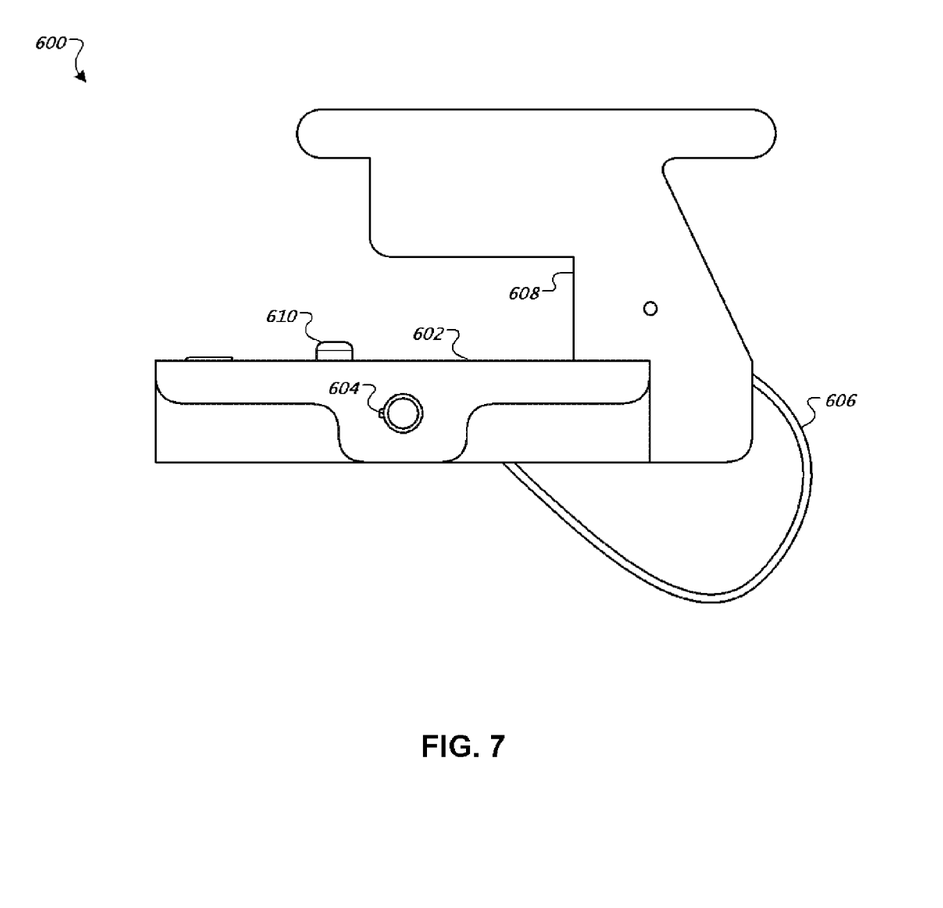
FIG. 7 is a side view of a saddle bracket.

FIG. 7 is a side view of the saddle bracket 600. The saddle bracket 600 includes a side view of the quick release button 610. In some implementations, the quick release button 610 is spring loaded such that when the bracket 600 is slidably coupled to the crossbar, gravity locks the bracket 600 to the crossbar without requiring a user to engage portions of the bracket 600.

The quick release button 610 provides a locking mechanism to prevent unintentional disengagement of the saddle bracket 600 from the crossbar. The quick release button 610 thus provides a safety catch to ensure that products do not fall or disengage from the display system. The quick release button 610 can be depressed to enable removal of a product from display system 100, for example. Disassembling a product from a display includes depressing the quick release button 610 to allow the saddle bracket 600 to be removed from the crossbar 300, for example.

Figure 8:
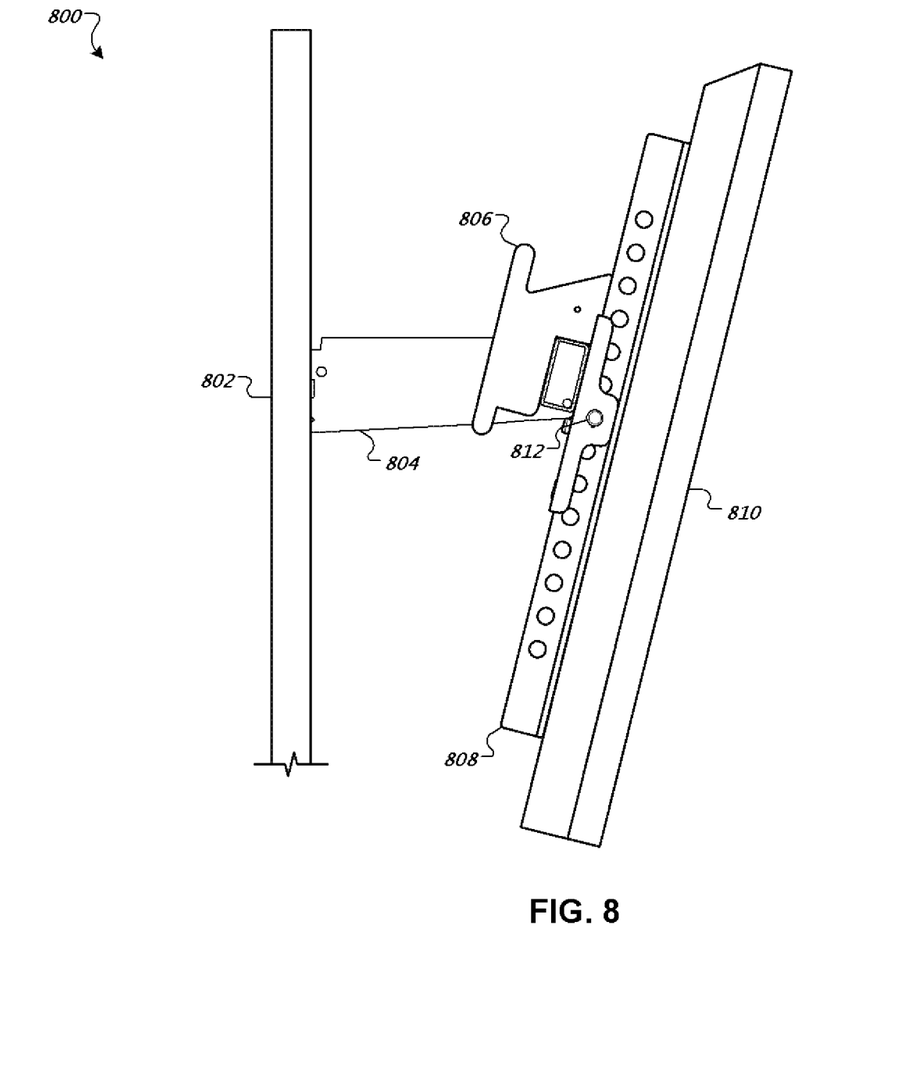
FIG. 8 is a side view of a merchandising display.

FIG. 8 is a side view of a merchandising display 800. The merchandising display 800 depicts a product assembly representative of a side view of a display shown in FIG. 1. In particular, the display 800 depicts a back panel 802 coupled to a crossbar 804. The crossbar 804 is depicted as a downward-slanted crossbar. The downward-slanted crossbar 804 latchably couples to the back panel 802. A saddle bracket is coupled to a mounting channel 808 that is connected to a display screen 810.

A quick release pin 812 is inserted into the mounting channel 808. A quick release button 610 is also provided to prevent unintended disconnection of the saddle bracket from the crossbar. Store personnel intending to dismount the display screen 810 can depress the quick release button 610 and then lift the display screen off the cross bar. Thereafter the quick release pin can be removed to detach the saddle bracket from the mounting channel 808.

In some implementations, one or more electrical cords (not shown) from the display screen 810 is optionally wrapped around a cord receiving flanges 806. Display monitors such as that shown in FIG. 8 are typically provided with power cords having lengths of at least five feet. Power receptacle may be provided on the back panel 802 proximate to crossbar 804. In such embodiments the several feet of excess cord may be wrapped around the cord receiving flanges 806, thereby securing the cord and hiding it from view.

A number of embodiments have been described. Nevertheless, it will be understood that various modifications are optionally made without departing from the spirit and scope of this disclosure. Accordingly, other embodiments are within the scope of the following claims.

What is claimed is:

1. A retail display system, comprising:
   a hanger including:
      a horizontal support member, and
      side brackets extending rearwardly from both sides of the horizontal support member, wherein each of the side brackets includes a rearwardly extending peg opposite the horizontal support member, and each rearwardly extending peg is received within a corresponding space of a display fixture such that the horizontal support member is spaced apart from the display fixture by at least about five inches;
   bracket means adapted to be attached to a television monitor to be displayed, said bracket means configured to matably and toollessly mount on the horizontal support member and thereby secure the television monitor to the display fixture without the use of fasteners interconnecting the bracket means to the horizontal support member; and
   mounting means that toollessly attaches to the bracket means, wherein the mounting means is rigidly attached to the television monitor;
   wherein the bracket means includes a quick release means to secure the bracket means in place on the horizontal support member and wherein the quick release means is spring-loaded and toollessly actuated to extend below the horizontal support member.

2. The system of claim 1, wherein the television monitor when mounted on the horizontal support member is positioned at a cant angle that is oblique relative to vertical such that a viewing screen on the television monitor is tilted downwards at substantially the cant angle targeted toward a floor.

3. The system of claim 2, wherein the cant angle is between about 5 degrees and about 20 degrees.

4. The system of claim 2, wherein the cant angle is about 15 degrees.

5. The system of claim 1, wherein the bracket means substantially rigidly mounts the television monitor in a fixed position relative to the hanger.

6. The system of claim 1, wherein the horizontal support member includes detent means that impede lateral slidable movement of the bracket means on the horizontal support member.

7. The system of claim 1, wherein the bracket means includes a downwardly facing generally U-shaped channel configured to receive the horizontal support member.

8. The system of claim 1, wherein the bracket means further comprises a cord receiving means to retain a length of an electrical cord extending from the television monitor.

9. A retail display system, comprising:
   a hanger member including a laterally extending crossbar and having a front surface and a back surface, the hanger member further including rearwardly extending mounting portions adapted to be received within a vertically extending display fixture, wherein the vertically extending display fixture extends upwardly relative to a floor, and one of the front surface and the back surface extends along a plane positioned at a cant angle that is oblique relative to vertical and targeted toward the floor; and
   a saddle bracket attached to a consumer electronics device and having a channel configured to matably and toollessly mount on the crossbar and thereby secure the consumer electronics device to the display fixture without the use of fasteners interconnecting the saddle bracket and the crossbar such that the consumer electronics device is tilted downwards at substantially the cant angle;
   wherein:
      the saddle bracket includes a bracket guide fixedly secured relative to the channel,
      the retail display system further comprises a mounting rail rigidly attached to the consumer electronics device,
      the bracket guide slidably receives the mounting rail and is configured to be selectively locked in place along the mounting rail to secure the saddle bracket to the consumer electronics device,
      the mounting rail includes two opposing sides, and
      the retail display system further comprises a pin selectively extending through the bracket guide and the two opposing sides of the mounting rail when the saddle bracket is attached to the consumer electronics device.

10. The system of claim 9, wherein the consumer electronics device comprises a display monitor.

11. The system of claim 9, further including a mounting member that toollessly attaches to the saddle bracket, wherein the mounting member is rigidly attached to the consumer electronics device.

12. The system of claim 9, wherein the saddle bracket includes quick release means to secure the saddle bracket in place on the crossbar and wherein the quick release means is toollessly actuated.

13. The system of claim 9, wherein the saddle bracket substantially rigidly mounts the consumer electronics device in a fixed position relative to the crossbar.

14. The system of claim 9, wherein the crossbar includes detent means that impede lateral slidable movement of the saddle bracket on the crossbar.

15. The system of claim 9, wherein the cant angle is between about 5 degrees and about 20 degrees.

16. The system of claim 9, wherein the cant angle is about 15 degrees.

17. The system of claim 9, wherein the saddle bracket includes a downwardly facing generally U-shaped channel configured to receive the crossbar.

18. The system of claim 9, wherein the mounting portions include end brackets providing an about 5 inch to an about 10 inch standoff from the display fixture.

19. The system of claim 9, wherein the saddle bracket further comprises a cord receiving member adapted to retain a length of an electrical cord.

* * * * *